May 13, 1930.    R. N. PERKINS    1,758,331
FILTERING SYSTEM
Filed Oct. 16, 1928    2 Sheets-Sheet 1

Inventor
R. N. Perkins
By
Attorney

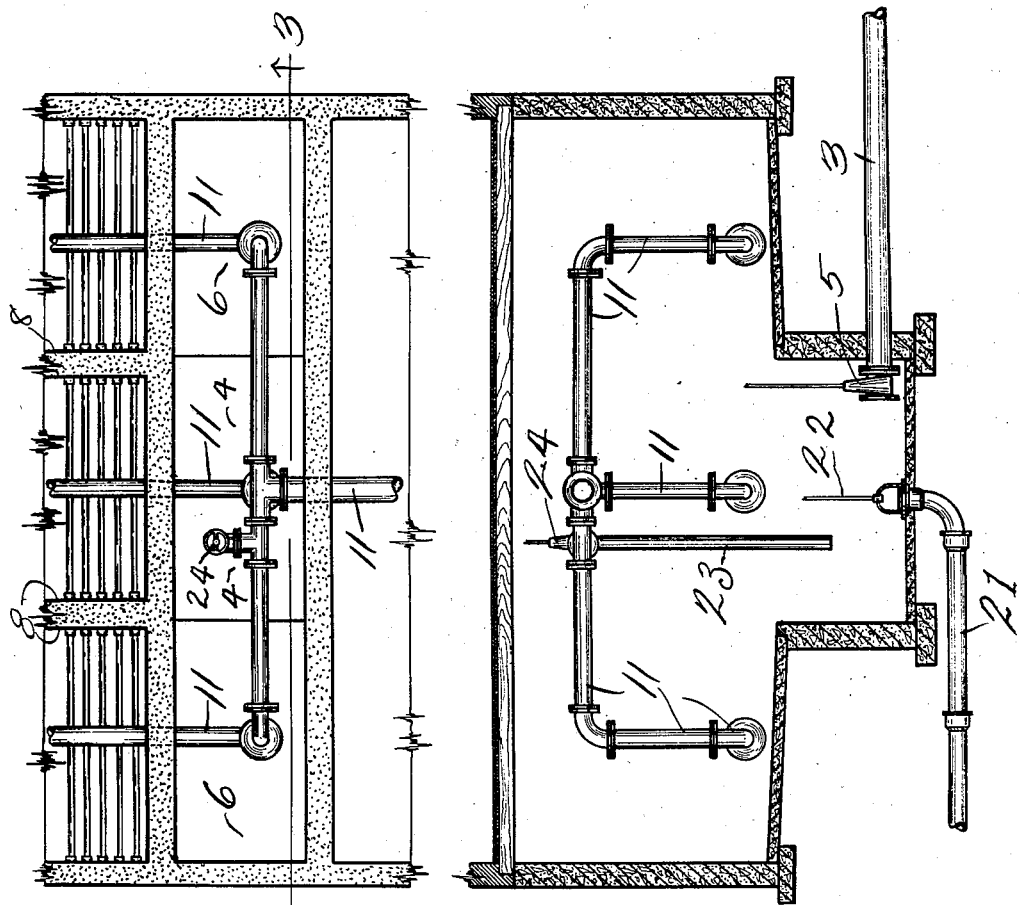

Patented May 13, 1930

1,758,331

UNITED STATES PATENT OFFICE

RALPH N. PERKINS, OF OMAHA, NEBRASKA

FILTERING SYSTEM

Application filed October 16, 1928. Serial No. 312,789.

The invention relates to filtering systems, particularly of the kind used in connection with swimming pools, and has for its object to provide a system wherein water is taken off from the bottom of the swimming pool, preferably from the lowest portion thereof, and is discharged into a sediment trap from which it flows into filters above the beds thereof and pump means connected to perforated pipes extending into the filter beds and forming means whereby water is sucked from the beds.

A further object is to provide a system of perforated laterals connected to a header in the bottom of the cells over which gravel and sand is laid, and a collector system of pipes connecting the headers to a suction pump, forms means whereby water is sucked through the filter beds.

A further object is to provide the pump with a discharge pipe leading back to the pool, into a clear well, a stand pipe, or elevated tank, forming means whereby with one pumping operation, water may be filtered and delivered to the desired end.

A further object is to dispose the pump below the water level in the filter so as to obviate the necessity of priming.

A further object is to provide the pump suction and discharge lines with a by-pass pipe connection between the suction line and the discharge line leading from the swimming pool and valves carried by said lines and forming means whereby water may be by-passed through the suction line and forced upwardly through the filtering bed for back washing the beds.

A further object is to provide a branch pipe in connection with the suction line and disposed within the sediment trap, and provided with a valve, which valve when opened will allow the pump to suck the water from the sediment trap when so desired.

A further object is to supply, by the compartment supplying the filters, a place where treating chemical may be fed by gravity into the water before it is filtered.

A further object is to apply the force which actuates the passage of water through the filter below the top of the filter sand, so the flocculent precipitate of aluminum hydroxide, used to seal the space between the grains of sand is held firmly in place and prevents the passage of unfiltered water.

A further object is to construct an open filter having a minimum depth and one wherein capacities as high as four to five gallons per minute may be passed through one square foot of filter surface without building the cell sufficiently high to establish the necessary column head to accomplish this.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 2 is a top plan view of a portion of the filter, and the sediment trap.

Figure 3 is a vertical sectional view taken on line 3—3 of Figure 2.

Figure 1:
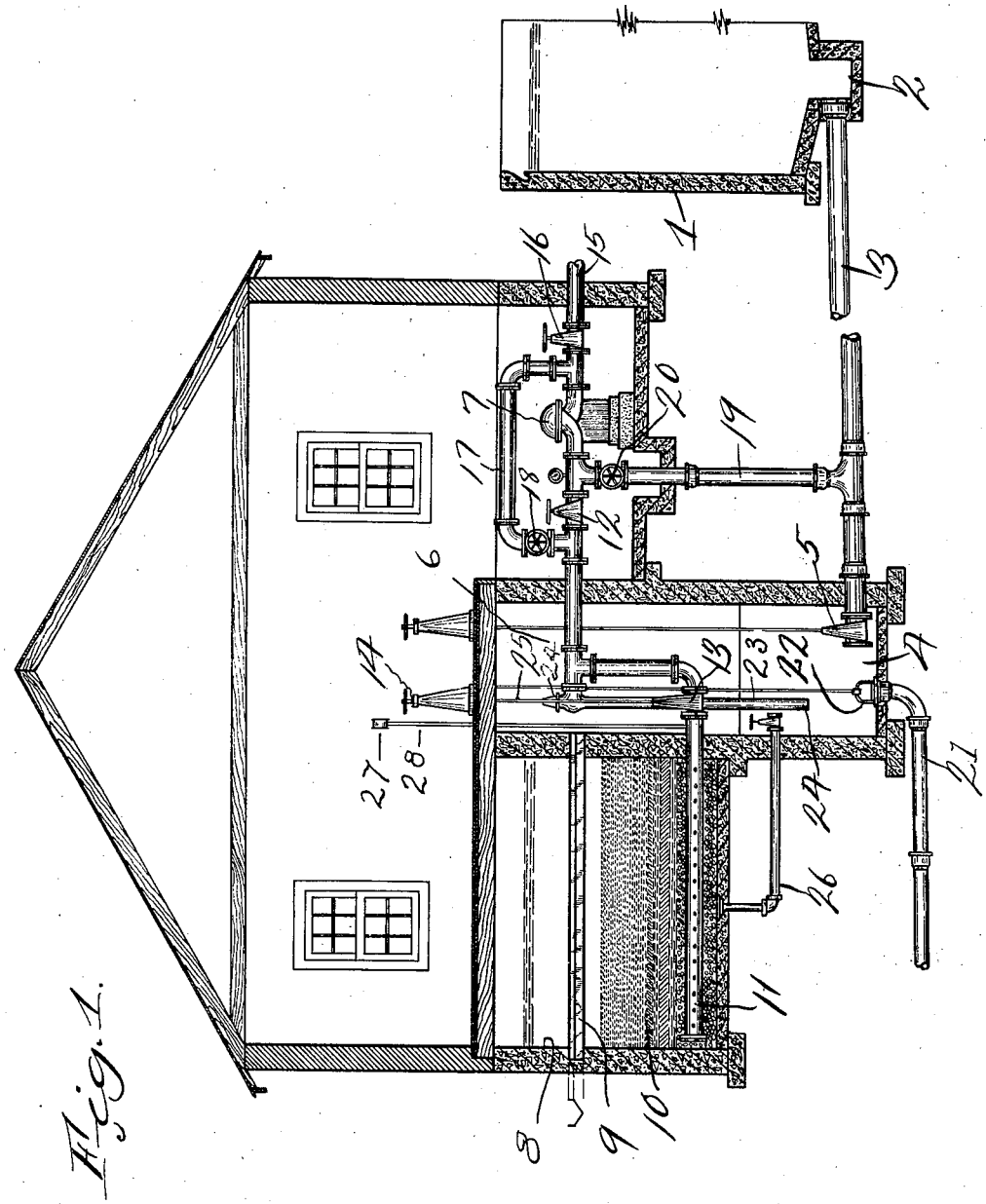
Figure 1 is a vertical transverse sectional view through the filter and swimming pool showing the system applied thereto.

Referring to the drawings, the numeral 1 designates a swimming pool and 2 an outlet trough therein, which is at the lowest portion of the pool, and is connected by means of a discharge pipe 3 with a sediment trap 4 at a lower level than the said trough 2, so as to permit water by means of gravity force to be freely discharged into the sediment trap 4. Said pipe 3 is provided with a valve 5 so that compartments 6 and 4 may be drained and cleaned when desired.

Under normal conditions of action the water in the compartment supplying the filters will maintain a level such that the gravity inflow through the pipe 3 will be equal to the actuated discharge into the pool 1 of the pump 7, which of course, could only occur after the water had reached a sufficient level to permit the water to flow into a compartment 8 over a steel trough 9, from which compartment it is sucked downward through the built up sand bed 10, passing through apertures in the lower side of the discharge pipe 11 from whence it is returned through the pump to the swimming pool. The suction pipe adjacent the pump 7 is preferably provided with a valve 12 by means of which the passage way of water through the suction pipe can be closed. The pipe 11 is also provided with a second valve 13, which is controlled by a valve rod 14 located upon the operating floor where it can be conveniently manipulated.

Connected to the pump 7 is a discharge pipe 15 which discharges into the swimming pool 1, therefore it will be seen that a continuous flow of water is maintained at all times. The pipe 15, adjacent its discharging end is provided with a valve 16, which has the double function of controlling through partial closure, the flow of water therethrough or when completely closed will cause the water to be forced in a reverse direction through a by-pass pipe 17 which by-pass is provided with a valve 18, which when closed will cut out the by-pass passage.

Connected to the suction pipe 11 between the pump 7 and the valve 12 is a pipe 19 which pipe is in turn connected to the pipe 3 and provided with a controlling valve 20. When it is desired to back wash the filtering bed 10, the valve 20 carried by the pipe 19 is opened, valves 5, 12 and 16 closed and the valves 18 and 13 opened, therefore it will be seen that the pump 7 will suck water from the pipe 3 and force the water through the by-pass 17 and thence through the suction pipe 11 and upwardly through the filter bed, thereby cleansing the filtering material. The water during the back washing operation flows into the sediment trap from which it is drained through the pipe 21 when the valve 22 is opened. There is also provided a sump suction pipe 23 controlled by a valve 24 by means of a valve stem 25 which, when the valve 24 is open, enables water to be sucked from the compartments 6 and 4 down to the bottom of the pipe 23. The bottom of the filter is preferably provided with a drain pipe 26, which discharges into the sediment trap 4, and through which water may be drained from the bottom of the filtering chamber when desired, for instance the water below the perforated portion of the suction pipe 11.

As a means for ascertaining the resistance controlling the flow of water through the sand (caused by the accumulation of refuse upon the beds) a vacuum gauge 27, conspicuously located in the operating room, is provided. The same being connected with a pipe 28 leading through the sediment trap 4 to its connection with the suction pipe 11 adjacent its valve 13. Under some circumstances the depth of the sewer is such that the drain line 21 can not be laid as low as shown in Figure 1 and it is then necessary that the pipe line 21 be brought into the compartment supplying the filters, at a higher elevation.

Under such conditions a small sump is built into the bottom of the sediment trap 4 and the suction pipe 23 is extended down into this sump and the discharge pipes 15 bifurcated and provided with valves so the water remaining in the bottom of the sediment trap not carried away by the waste outlet, may be pumped through the said sump pipe and discharged into the sewer or other convenient outlets.

It will also be seen that a suction or negative head filter principle is used, thereby providing a system wherein the maximum efficiency is obtained. The advantage of the suction filter is, that it does away with building deep basins which are necessary in the case of gravity filters where dependence must be placed upon the head of water above the sand. In the case of a pressure filter which must be closed on top, the head above the sand is maintained by a pump as a hydraulic pressure. In a suction filter only sufficient head room need be provided above the sand which will act as a seal between the compartments and the top of the sand.

It is to be understood that the present filtering system may be used for water purification plants, swimming pools or any other purpose, and applicant does not limit himself in this respect. In case of use to filter a city's supply of water the plant is built adjacent to the settling basin and the water pipes to the compartment supply filters. No clear well, or storage compartment below the filter plant, is necessary in this case, for the water flows by gravity from the settling basin to the filtering plant, is filtered by suction and is pumped directly to the stand pipe or into the main eliminating the expense of clear well construction.

From the above it will be seen that a filtering system is provided in connection with a swimming pool and in which system water is sucked through a filtering bed and is recirculated through the filter and swimming pool whereby the water will be maintained clean in the pool.

The invention having been set forth what is claimed as new and useful is:

The combination with a swimming pool and filtering tank, a filtering material in said filtering tank, a sediment tank, a pipe carried by the swimming tank and discharging into the sediment tank, a suction pump disposed below the water level of the swimming pool and filtering tank, a suction pipe extending into the filtering material and connected to the pump, a discharge pipe connecting the pump and the swimming tank and a by-pass pipe connecting the pump, suction and discharge pipes and in combination with a pipe connection between the pump suction pipe and the first mentioned pipe forming means whereby the filtering material may be back washed.

In testimony whereof I hereunto affix my signature.

RALPH N. PERKINS.